(12) United States Patent
Heo et al.

(10) Patent No.: US 11,756,202 B2
(45) Date of Patent: Sep. 12, 2023

(54) METHOD FOR SEMANTIC SEGMENTATION BASED ON KNOWLEDGE DISTILLATION

(71) Applicant: AJOU UNIVERSITY INDUSTRY-ACADEMIC COOPERATION FOUNDATION, Suwon-si (KR)

(72) Inventors: Yong Seok Heo, Seoul (KR); Sangyong Park, Daegu (KR)

(73) Assignee: AJOU UNIVERSITY INDUSTRY—ACADEMIC COOPERATION FOUNDATION, Suwon-si (KR)

( * ) Notice: Subject to any disclaimer, the term of this patent is extended or adjusted under 35 U.S.C. 154(b) by 227 days.

(21) Appl. No.: 17/222,055

(22) Filed: Apr. 5, 2021

(65) Prior Publication Data
US 2021/0334543 A1 Oct. 28, 2021

(30) Foreign Application Priority Data
Apr. 28, 2020 (KR) .......................... 10-2020-0051719

(51) Int. Cl.
*G06T 7/00* (2017.01)
*G06T 7/11* (2017.01)
(Continued)

(52) U.S. Cl.
CPC ................ *G06T 7/11* (2017.01); *G06N 3/045* (2023.01); *G06V 10/764* (2022.01); *G06V 10/82* (2022.01); *G06V 20/41* (2022.01); *G06V 20/695* (2022.01)

(58) Field of Classification Search
CPC ...... G06V 20/41; G06V 10/32; G06V 10/764; G06V 10/82; G06V 20/695; G06N 3/045;
(Continued)

(56) References Cited

U.S. PATENT DOCUMENTS

2019/0205748 A1* 7/2019 Fukuda .................. G06N 3/044

FOREIGN PATENT DOCUMENTS

| KR | 10-2017-0034258 A | 3/2017 |
| KR | 10-2018-0096473 A | 8/2018 |

OTHER PUBLICATIONS

Liu et al, structured Knowledge Distillation for Semantic Segmentation, CVPR (Year: 2019).*
(Continued)

*Primary Examiner* — Nancy Bitar
*Assistant Examiner* — Xiao Liu
(74) *Attorney, Agent, or Firm* — Sughrue Mion, PLLC

(57) ABSTRACT

A knowledge distillation based semantic image segmentation method includes inputting an input image to a teacher network and a student network; normalizing a first feature vector corresponding to each pixel in a feature map of a last layer of the teacher network and normalizing a second feature vector corresponding to each pixel in a feature map of a last layer of the student network; generating the first channel and space association matrix and the second channel and space association matrix based on the normalized first feature vector and the normalized second feature vector, and defining a first loss function based on a Euclidean norm value of the difference between the first channel and space association matrix and the second channel and space association matrix.

8 Claims, 6 Drawing Sheets

(51) Int. Cl.
    *G06V 20/40*     (2022.01)
    *G06N 3/045*     (2023.01)
    *G06V 10/764*    (2022.01)
    *G06V 10/82*     (2022.01)
    *G06V 20/69*     (2022.01)
(58) Field of Classification Search
    CPC ... G06N 3/08; G06T 7/11; G06T 2207/20081;
                                   G06T 2207/20084
    See application file for complete search history.

(56) References Cited

OTHER PUBLICATIONS

Shan, Distilling Pixel-Wise Feature Similarities for Semantic Segmentation, arXiv:1910.14226v1 Oct. 31, 2019.*
He et al, Knowledge Adaptation for Efficient Semantic Segmentation, arXiv:1903.04688v1, Mar. 12, 2019.*
Nader Karimi Bavandpour et al, Class Attention Map Distillation for Efficient Semantic Segmentation, International Conference on Machine Vision and Image Processing (MVIP), pp. 1-6 (Year: 2020).*
Wang et al, DeepVID: Deep Visual Interpretation and Diagnosis for Image Classifiers via Knowledge Distillation, IEEE Transactions on Visualization and Computer Graphics, vol. 25, No. 6, Jun. 2019.*
Jiafeng Xie et al., "Improving Fast Segmentation With Teacher-student Learning", arXiv:1810.08476v1, Oct. 2018, 13 pages.
Sanghyun Woo et al., "CBAM: Convolutional Block Attention Module", arXiv:1807.06521v2, Jul. 2018, 17 pages.
Jun Fu et al., "Dual Attention Network for Scene Segmentation", arXiv:1809.02983v4, Apr. 2019, 10 pages.
Korean Office Action of KR10-2020-0051719 dated Oct. 27, 2020.
Korean Office Action of KR10-2020-0051719 dated Dec. 8, 2020.

* cited by examiner

FIG. 5
| METHOD | VERIFICATION mIoU(%) | TRAINING mIoU(%) | TEST mIoU(%) |
|---|---|---|---|
| TEACHER NETWORK | 74.43 | 79.23 | 72.55 |
| Resnet34 (CE) | 67.94 | 72.35 | 64.87 |
| Resnet34 (CSC+CE) | 68.99 | 72.79 | 66.43 |
FIG. 6A
FIG. 6B
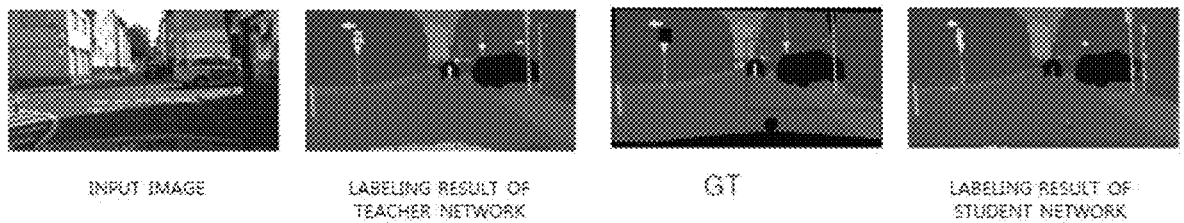
INPUT IMAGE    LABELING RESULT OF TEACHER NETWORK    GT    LABELING RESULT OF STUDENT NETWORK
FIG. 6C
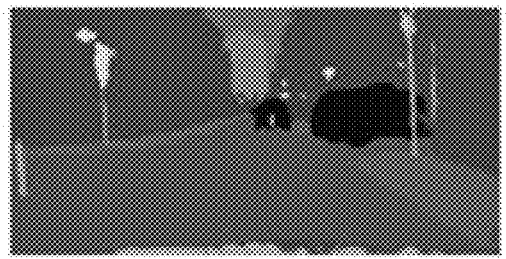
LABELING RESULT OF STUDENT NETWORK TO WHICH METHOD ACCORDING TO EXEMPLARY EMBODIMENT OF PRESENT DISCLOSURE IS APPLIED FIG. 7
| METHOD | VERIFICATION mIoU(%) | TRAINING mIoU(%) | TEST mIoU(%) |
|---|---|---|---|
| TEACHER NETWORK | 75.05 | 81.11 | 70.73 |
| Resnet34 (CE) | 62.96 | 65.88 | 57.90 |
| Resnet34 (CSC+CE) | 65.53 | 68.47 | 60.40 |
FIG. 8A
FIG. 8B
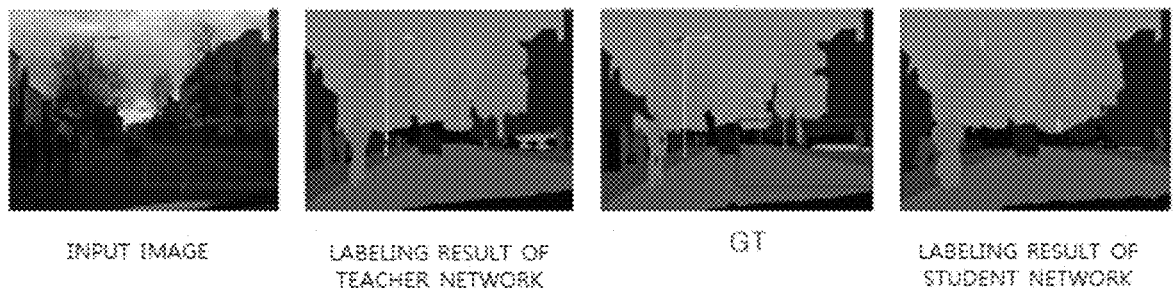
INPUT IMAGE | LABELING RESULT OF TEACHER NETWORK | GT | LABELING RESULT OF STUDENT NETWORK
FIG. 8C
LABELING RESULT OF STUDENT NETWORK TO WHICH METHOD
ACCORDING TO EXEMPLARY EMBODIMENT OF PRESENT
DISCLOSURE IS APPLIED

METHOD FOR SEMANTIC SEGMENTATION BASED ON KNOWLEDGE DISTILLATION

CROSS-REFERENCE TO RELATED APPLICATIONS

This application claims the priority of Korean Patent Application No. 10-2020-0051719 filed on Apr. 28, 2020, in the Korean Intellectual Property Office, the disclosure of which is incorporated herein by reference.

BACKGROUND

Field

The present disclosure relates to a semantic image segmentation method based on knowledge distillation.

Description of the Related Art

The semantic segmentation is an algorithm which classifies objects in an image into pixels and has an advantage in that the objects may be simultaneously detected and classified by the image segmentation.

In the meantime, the knowledge distillation is one of network compression methods which effectively compress a model so as to apply a trained artificial neural network to an actual service, thereby improving a speed. According to the knowledge distillation, a network with a small computational amount and a small memory usage amount, which is called a student network, may be trained using a network having a relatively high performance network, called a teacher network. At this time, a loss function which compares a feature map of the teacher network and a feature map of the student network is defined and the student network is trained using the loss function.

The teacher network transfers knowledge to the student network by means of the knowledge distillation so that the student network may achieve a high recognition rate as compared with a case that it is trained from the beginning only using a general backpropagation algorithm. Accordingly, a technique for applying the knowledge distillation to the semantic image segmentation is being studied.

SUMMARY

An object is to propose a method which improves a performance of a student network by providing a knowledge distillation based semantic image segmentation method in which association between labels and a spatial association between pixels are considered.

According to an aspect, a knowledge distillation based semantic image segmentation method includes: inputting an input image to a teacher network and a student network; normalizing a first feature vector corresponding to each pixel in a feature map of a last layer of the teacher network and normalizing a second feature vector corresponding to each pixel in a feature map of a last layer of the student network; generating the first channel and space association matrix and the second channel and space association matrix based on the normalized first feature vector and the normalized second feature vector, and defining a first loss function based on an Euclidean norm value of the difference between the first channel and space association matrix and the second channel and space association matrix.

The knowledge distillation based semantic image segmentation method according to an exemplary embodiment may further include: a step of defining an entire loss function using the first loss function and a cross entropy loss function, and determining one label among a plurality of labels for each pixel of an input image using the entire loss function.

According to the exemplary embodiment, the defining of the entire loss function includes defining the entire loss function based on the first loss function, a weight for the first loss function, the cross entropy loss function, and a weight for the cross entropy loss function.

When the number of labels for the input image is C, the generating of a first channel and space association matrix includes: calculating a first channel associated vector with respect to the C labels, based on the normalized first feature vector and a circularly shifted vector of the normalized first feature vector; calculating a first channel association matrix by concatenating and realigning the first channel associated vector for the C labels; and determining a first channel association matrix as a first channel and space association matrix.

Further, the generating of a second channel and space association matrix includes: calculating a second channel associated vector with respect to the C labels, based on the normalized second feature vector and a circularly shifted vector of the normalized second feature vector; calculating a second channel association matrix by concatenating and realigning the second channel associated vector for the C labels; and determining a second channel association matrix as a second channel and space association matrix.

Here, the first channel association vector may be determined by performing element-wise multiplication on the normalized first feature vector and a circularly shifted vector of the normalized first feature vector with respect to C labels.

In the meantime, a width of the first channel association matrix and the second channel association matrix may be a value obtained by multiplying a width and a height of a feature map of a last layer of the teacher network and a height of the first channel association matrix and the second channel association matrix is a square of C.

Further, the widths and the heights of the first channel and space association matrix and the second channel and space association matrix may be values obtained by multiplying the width and the height of the feature map of the last layer of the teacher network.

The knowledge distillation based semantic image segmentation method according to an exemplary embodiment may further include training the student network using the entire loss function.

The present disclosure provides a computer readable storage medium which stores a computer program which allows the above-described method to be performed when the computer program is executed by a processor.

According to an exemplary embodiment disclosed in the present disclosure, knowledge of the teacher network is transferred to the student network using not only a spatial association between pixels in an image, but also a matrix containing association information between labels so that the performance of the student network may be improved.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 5 to 8C are views for explaining a performance of a knowledge distillation based semantic image segmentation method according to an exemplary embodiment of the present disclosure.

DETAILED DESCRIPTION OF THE PREFERRED EMBODIMENT

Figure 1:
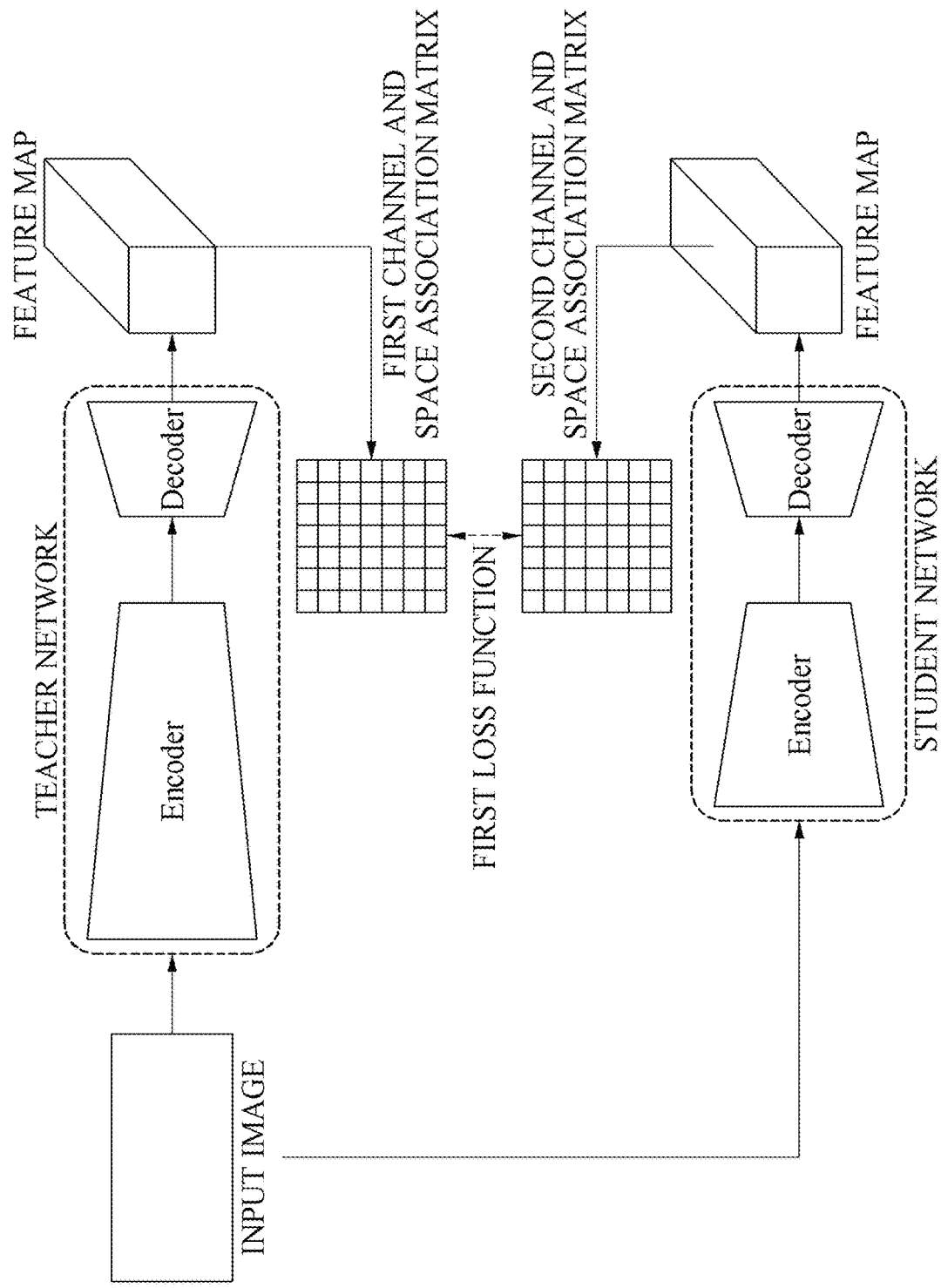
FIG. 1 is a view for explaining a knowledge distillation based semantic image segmentation method according to an exemplary embodiment of the present disclosure.

Those skilled in the art may make various modifications to the present disclosure and the present disclosure may have various embodiments thereof, and thus specific embodiments will be illustrated in the drawings and described in detail in detailed description. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present disclosure, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present disclosure. A singular form may include a plural form if there is no clearly opposite meaning in the context. In the present application, it should be understood that term "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

FIG. 1 is a view for explaining a knowledge distillation based semantic image segmentation method according to an exemplary embodiment of the present disclosure.

When an input image is input to a teacher network and a student network, the teacher network and the student network may output feature maps via an encoder and a decoder, respectively. The semantic image segmentation method according to an exemplary embodiment of the present disclosure may extract channel and space association matrixes from feature maps of the teacher network and the student network and defines a first loss function by the extracted channel and space association matrixes. Thereafter, the sematic image segmentation method according to the exemplary embodiment of the present disclosure may train the student network based on a first loss function.

Figure 2:
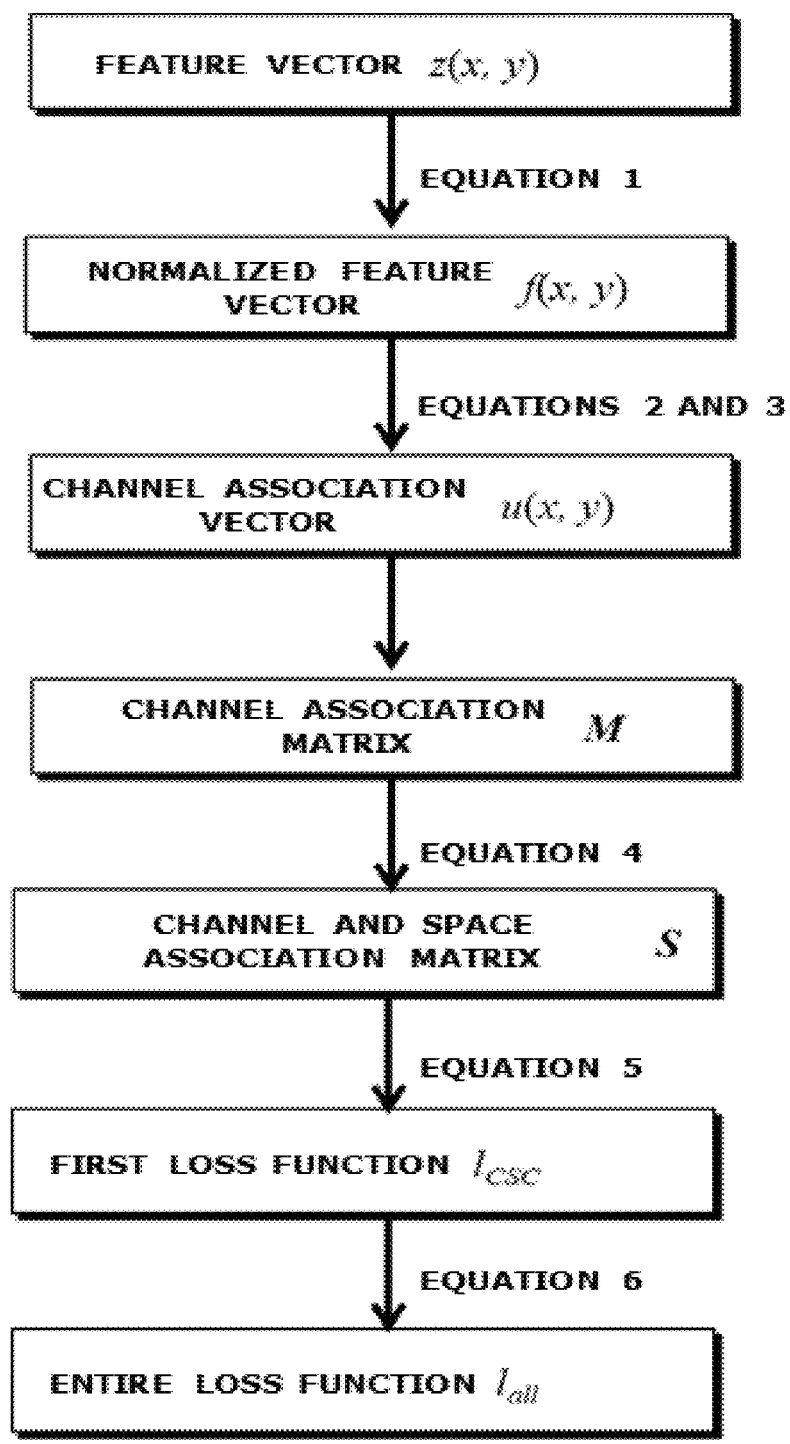
FIG. 2 is a view for explaining a process of calculating an entire loss function according to an exemplary embodiment of the present disclosure.

FIG. 2 is a view for explaining a process of calculating an entire loss function according to an exemplary embodiment of the present disclosure.

The knowledge distillation based semantic image segmentation method according to the exemplary embodiment of the present disclosure may define the first loss function using a feature map of a last layer of the teacher network and a feature map of a last layer of the student network. Specifically, the method according to the exemplary embodiment of the present disclosure generates a first channel and space association matrix based on the teacher network and generates a second channel and space association matrix based on the student network. The process of generating individual channel and space association matrixes is as follows:

When the feature map of the last layer of the teacher network or the student network is defined as z, z is a matrix with a magnitude of $z \in R^{C \times H \times W}$. Here, W is a width of the feature map and H is a height of the feature map. Further, C refers to a number of channels of the feature map, which is the same as a number of labels which may correspond to each pixel of the input image.

The method according to the exemplary embodiment of the present disclosure has to calculate the channel and space association matrix S to transfer the feature map of the teacher network in which the association between channels and the spatial association are maintained, to the student network.

To this end, each feature vector $z(i,j)$ for each position $(i,j)$ in the input image is normalized by Equation 1 to acquire a normalized feature vector $f(i,j)$ for each position $(i,j)$.

$$f(i, j) = \frac{z(i, j)}{\|z(i, j)\|_2} \quad \text{[Equation 1]}$$

Here, $\|\bullet\|_2$ refers to an Euclidean norm (L2-norm) operation. In order to calculate inter-channel association in a spatial position $(i,j)$ of each feature map, a channel associated vector $U_s(i,j)$ is defined by the following Equation 2.

$$u_s(i,j) = f(i,j) \otimes f_s(i,j) \quad \text{[Equation 2]}$$

Here, $f_s(i,j)$ refers to a vector obtained by circularly shifting an original vector $f(i,j)$ by $s-1$ and $\otimes$ refers to element-wise multiplication. C different $U_s(i,j)$ vectors are connected to obtain a channel association vector $u(i,j) \in R^{C^2}$ as represented in the following Equation 3.

$$u(i, j) = u_1(i, j) \oplus u_2(i, j) \oplus \ldots \oplus u_C(i, j) \quad \text{[Equation 3]}$$

Here, $\oplus$ refers to concatenation.

Thereafter, two-dimensional inter-channel association matrix $M \in R^{C \times HW}$ may be obtained by realigning the entire vectors with an inter-channel association.

Figure 3:
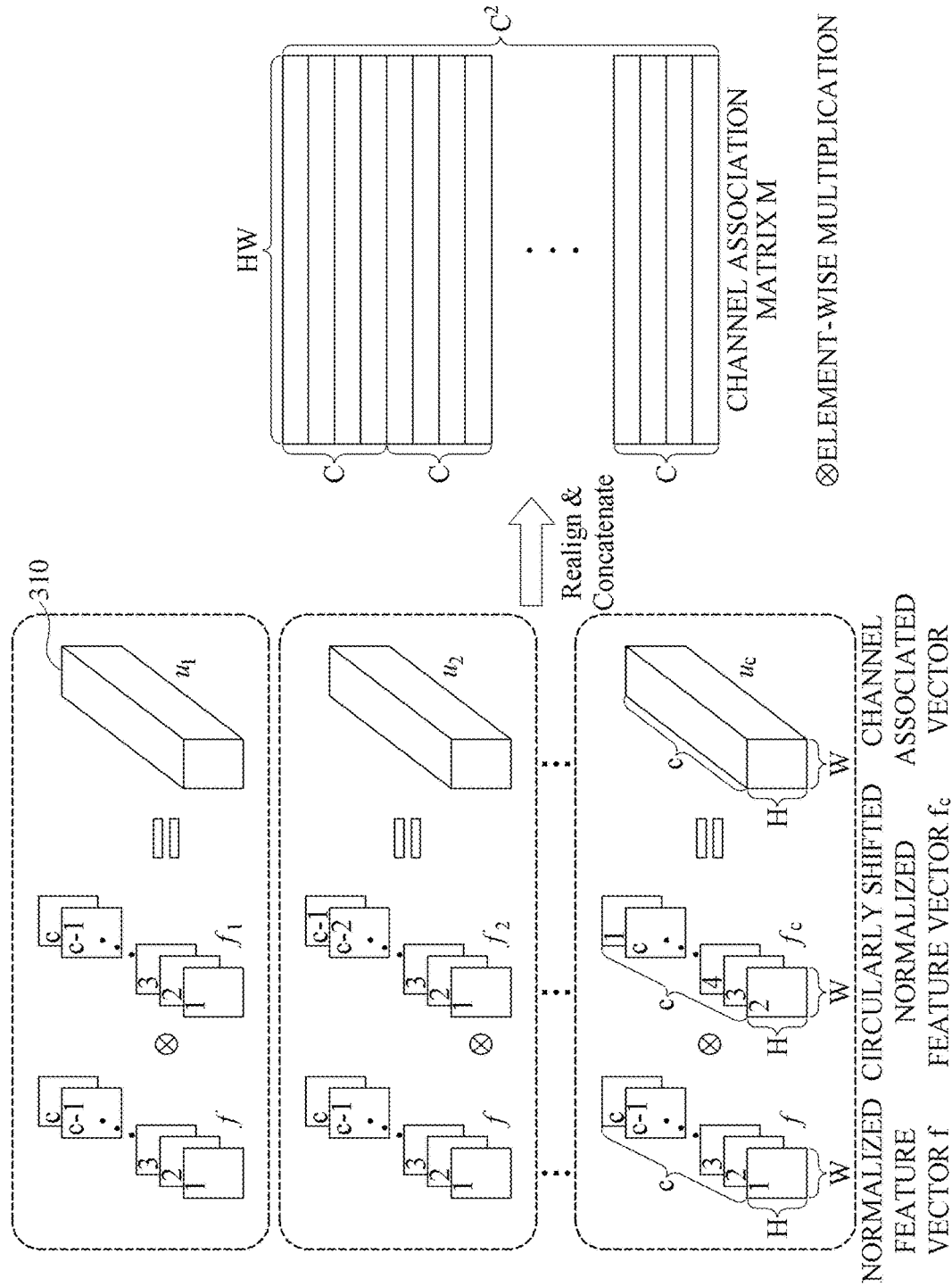
FIG. 3 is a view for explaining a process of calculating a channel association matrix according to an exemplary embodiment of the present disclosure.

A method of calculating a channel associated vector $U_s(i,j)$, a channel association vector $u(i,j)$, and an inter-channel association matrix M is illustrated in FIG. 3.

Referring to FIG. 3, a first channel associated vector $u_1$ 310 may be obtained by performing element-wise multiplication on a normalized feature vector f and a vector $f_1$ obtained by circularly shifting the normalized feature vector by 1. When this operation is repeated as many as the number of channels, C channel associated vectors $u_1$ to $u_c$ may be obtained. At this time, each channel associated vector has a magnitude of $u_s(i,j) \in R^{C \times H \times W}$. Thereafter, when all the channel associated vector are concatenated, the channel association vector u may be obtained and when the channel association vectors u are realigned, the inter-channel association matrix M may be obtained.

Referring to FIG. 2 again, a two-dimensional channel and space association matrix $S \in R^{HW \times HW}$ may be obtained as represented in Equation 4 using the inter-channel association matrix M.

$$S = M^T M \quad \text{[Equation 4]}$$

In the meantime, the first channel and space association matrix $S^t$ may be calculated based on the feature map of the teacher network and Equations 1 to 4 and a second channel and space association matrix $S^s$ may be calculated based on the feature map of the student network and Equations 1 to 4, and $M^T$ is a transposed matrix of the inter-channel association matrix M.

The first loss function $l_{csc}$ according to the exemplary embodiment of the present invention is defined by Equation 5, based on the first channel and space association matrix $S^t$ and the second channel and space association matrix $S^s$.

$$l_{CSC} = \frac{1}{(HW)^2} \sum_{y=1}^{HW} \sum_{x=1}^{HW} \|s^t(x, y) - s^s(x, y)\|_2^2 \quad \text{[Equation 5]}$$

Here, $S^t(x,y)$ refers to an (x,y)-th element value of the first channel and space association matrix acquired from the teacher network and $S^s(x,y)$ refers to an (x,y)-th element value of the second channel and space association matrix acquired from the student network.

In the meantime, the entire loss functions to train the student network may be represented by Equation 6.

$$l_{all} = \lambda_{CSC} \cdot l_{CSC} + \lambda_{CE} \cdot l_{CE} \quad \text{[Equation 6]}$$

Here, $\lambda_{csc}$ refers to a weight of the first loss function and $l_{CE}$ and $\lambda_{CE}$ may refer to a normal cross entropy loss function and a weight of the normal cross entropy loss function. The sematic image segmentation method according to the exemplary embodiment of the present disclosure may train the student network based on the entire loss functions.

Figure 4:
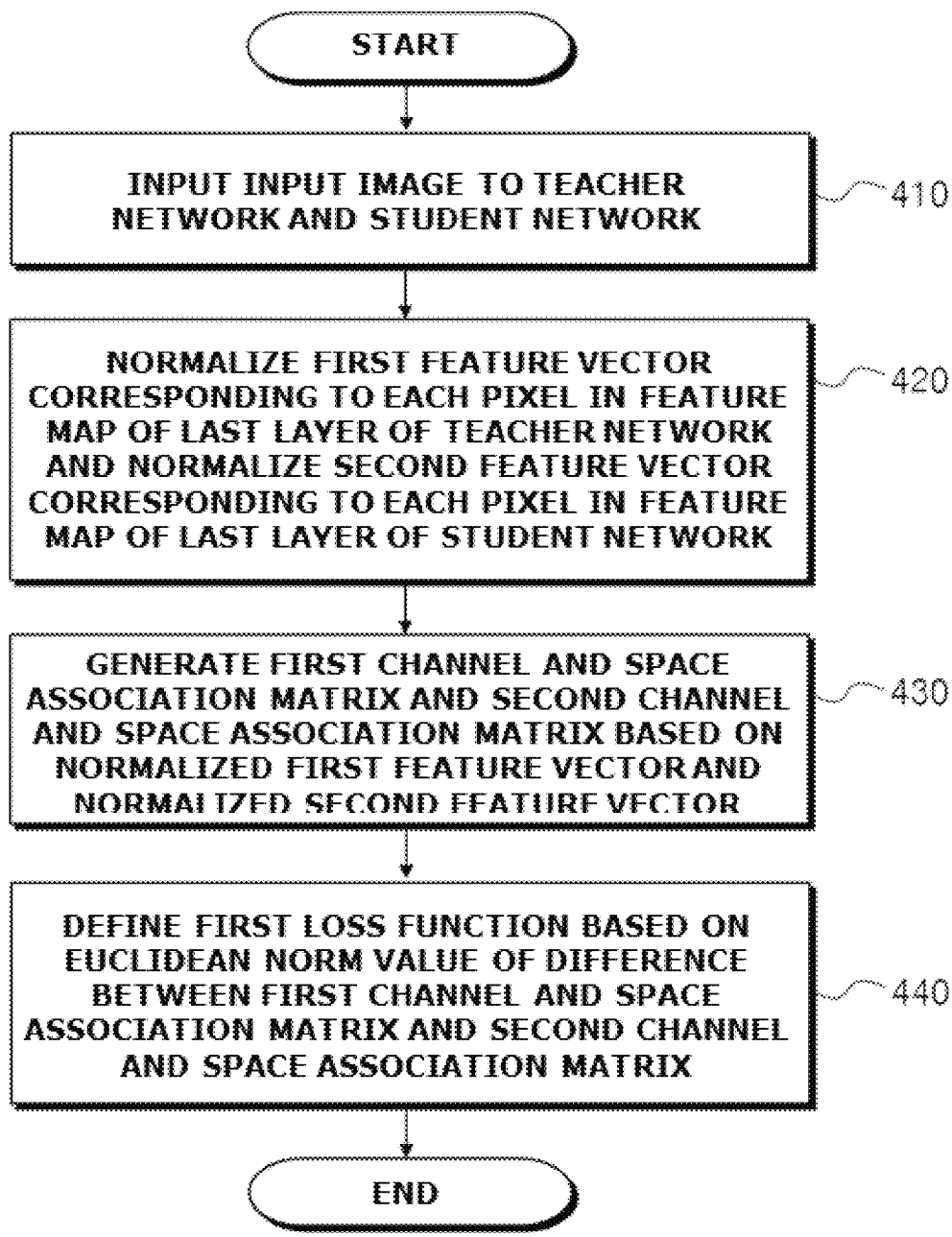
FIG. 4 is a flowchart illustrating a knowledge distillation based semantic image segmentation method according to an exemplary embodiment of the present disclosure.

FIG. 4 is a flowchart illustrating a knowledge distillation based semantic image segmentation method according to an exemplary embodiment of the present disclosure.

According to the knowledge distillation based semantic image segmentation method according to the exemplary embodiment of the present invention, in step 410, an input image may be input to a teacher network and a student network.

In step 420, a first feature vector corresponding to each pixel in the feature map of the last layer of the teacher network is normalized and a second feature vector corresponding to each pixel in the feature map of the last layer of the student network is normalized.

In step 430, the first channel and space association matrix and the second channel and space association matrix may be generated based on the normalized first feature vector and the normalized second feature vector.

If the number of labels for the input image is C, in step 430, the generating of the first channel and space association matrix includes a step of calculating a first channel associated vector based on a normalized first feature vector and a circularly shifted vector of the normalized first feature vector, a step of calculating the first channel association matrix by concatenating and realigning the first channel associated vector for C labels, and a step of determining a first channel association matrix as the first channel and space association matrix.

Here, the first channel associated vector may be determined by performing element-wise multiplication on the normalized first feature vector and a circularly shifted vector of the normalized first feature vector with respect to C labels.

Further, in step 430, the generating of the second channel and space association matrix includes a step of calculating a second channel associated vector based on a normalized second feature vector and a circularly shifted vector of the normalized second feature vector, a step of calculating the second channel association matrix by concatenating and realigning the second channel associated vector for C labels, and a step of determining a second channel association matrix as the second channel and space association matrix.

In the meantime, a width of the first channel association matrix and the second channel association matrix is a value obtained by multiplying a width and a height of the feature map of the last layer of the teacher network and a height of the first channel association matrix and the second channel association matrix is a square of C.

Further, the widths and the heights of the first channel and space association matrix and the second channel and space association matrix may be values obtained by multiplying the width and the height of the feature map of the last layer of the teacher network.

In step 440, the first loss function may be defined based on a Euclidean norm value of the difference between the first channel and space association matrix and the second channel and space association matrix.

Further, the knowledge distillation based semantic image segmentation method according to the exemplary embodiment of the present disclosure may further include a step of defining an entire loss function using the first loss function and a cross entropy loss function, and a step of determining one label among a plurality of labels for each pixel of an input image using the entire loss function.

In the meantime, the step of defining an entire loss function may include a step of defining the entire loss function based on the first loss function, a weight for the first loss function, the cross entropy loss function, and a weight for the cross entropy loss function.

Further, the knowledge distillation based semantic image segmentation method according to the exemplary embodiment of the present disclosure may further include a step of training the student network using the entire loss function.

FIGS. 5 to 8C are views for explaining a performance of a knowledge distillation based semantic image segmentation method according to an exemplary embodiment of the present disclosure.

In the experiment for verifying a performance of the knowledge distillation based semantic image segmentation method according to the exemplary embodiment of the present disclosure, the teacher network utilized Deeplab-V3+ structure and as an encoder of the teacher network, Xception65 was used. Further, as an encoder of the student network, Resnet34 was used.

As an experiment data set, Cityscapes and Camvid images were utilized. In the case of Cityscapes, a total number of labels was 19, a number of training data was 2,975, a number of verification data was 500, and a number of test data was 1,525. In the case of Camvid, a total number of labels was 12, a number of training data was 367, a number of verification data was 101, and a number of test data was 233.

FIG. 5 is a table for explaining a prediction precision of a sematic image segmentation method according to the exemplary embodiment of the present disclosure in which Resnet34 is utilized as an encoder of the student network when a Cityscapes image is input.

Referring to FIG. 5, it may be confirmed that a teacher network having a large memory usage amount and a large computational amount for verification data, training data, and test data has the highest prediction precision. It may be further confirmed that as the prediction precision (Resnet34 (CSC+CE)) of the semantic image segmentation method according to the exemplary embodiment of the present disclosure is higher than that of a case (Resnet34(CE)) in which a general cross entropy loss function is applied to a student network which utilizes Resnet34 encoder of the related art.

FIGS. 6A-6C are views for explaining a result of a sematic image segmentation method according to the exemplary embodiment of the present disclosure in which Resnet34 is utilized as an encoder of the student network when a Cityscapes image is input.

FIG. 6A explains labels and it is confirmed that a total of 19 labels is represented with different colors. FIG. 6B illustrates individual input images, a labeling result of a teacher network, a GT, and a labeling result when a cross entropy loss function of the related art of the student network is used. FIG. 6C illustrates a labeling result of a student network when a knowledge distillation based sematic image segmentation method according to an exemplary embodiment of the present disclosure is applied.

Referring to FIGS. 6B and 6C, it is confirmed that the labeling result when the knowledge distillation based sematic image segmentation method according to an exemplary embodiment of the present disclosure is applied has a lower precision than the labeling result of the teacher network, but the precision is improved as compared with the labeling result of the student network of the related art.

FIG. 7 is a table for explaining a prediction precision of a sematic image segmentation method according to the exemplary embodiment of the present disclosure in which Resnet34 is utilized as an encoder of the student network when a Camvid image is input.

Similarly to FIG. 5, it may be confirmed that a teacher network having a large memory usage amount and a large computational amount for verification data, training data, and test data has the highest prediction precision. It may be further confirmed that as the prediction precision (Resnet34 (CSC+CE)) of the semantic image segmentation method according to the exemplary embodiment of the present disclosure is higher than that of a case (Resnet34(CE)) in which a general cross entropy loss function is applied to a student network which utilizes Resnet34 encoder of the related art.

FIGS. 8A-8C are views for explaining a result of a sematic image segmentation method according to the exemplary embodiment of the present disclosure in which Resnet34 is utilized as an encoder of the student network when a Camvid image is input.

FIG. 8A explains labels and it is confirmed that a total of 12 labels is represented with different colors. FIG. 8B illustrates individual input images, a labeling result of a teacher network, a GT, and a labeling result when a cross entropy loss function of the related art of the student network is used. FIG. 8C illustrates a labeling result of a student network when a knowledge distillation based sematic image segmentation method according to an exemplary embodiment of the present disclosure is applied.

Similarly to FIGS. 6B and 6C, referring to FIGS. 8B and 8C, it is confirmed that the labeling result when a knowledge distillation based sematic image segmentation method according to the exemplary embodiment of the present disclosure is applied has a lower precision than the labeling result of the teacher network, but the precision is improved as compared with the labeling result of the student network of the related art.

It will be appreciated that various exemplary embodiments of the present invention have been described herein for purposes of illustration, and that various modifications, changes, and substitutions may be made by those skilled in the art without departing from the scope and spirit of the present invention. Accordingly, the exemplary embodiments disclosed herein are intended to not limit but describe the technical spirit of the present invention and the scope of the technical spirit of the present invention is not restricted by the exemplary embodiments. The protective scope of the present disclosure should be construed based on the following claims, and all the technical concepts in the equivalent scope thereof should be construed as falling within the scope of the present disclosure.

What is claimed is:

1. A knowledge distillation based semantic image segmentation method, comprising:
   inputting an input image to a teacher network and a student network;
   normalizing a first feature vector corresponding to each pixel in a feature map of a last layer of the teacher network and normalizing a second feature vector corresponding to each pixel in a feature map of a last layer of the student network;
   generating a first channel and space association matrix and a second channel and space association matrix based on the normalized first feature vector and the normalized second feature vector; and
   defining a first loss function based on a Euclidean norm value of the difference between the first channel and space association matrix and the second channel and space association matrix,
   wherein when the number of labels for the input image is C, the generating of a first channel and space association matrix includes:
      calculating a first channel associated vector with respect to the C labels, based on the normalized first feature vector and a circularly shifted vector of the normalized first feature vector;

calculating a first channel association matrix by concatenating and realigning the first channel associated vector for the C labels; and determining a first channel association matrix as a first channel and space association matrix.

2. The knowledge distillation based semantic image segmentation method according to claim 1, further comprising:

defining an entire loss function using the first loss function and a cross entropy loss function, and determining one label among a plurality of labels for each pixel of an input image using the entire loss function.

3. The knowledge distillation based semantic image segmentation method according to claim 2, wherein the defining of an entire loss function includes:

defining the entire loss function based on the first loss function, a weight for the first loss function, the cross entropy loss function, and a weight for the cross entropy loss function.

4. The knowledge distillation based semantic image segmentation method according to claim 2, further comprising:

training the student network using the entire loss function.

5. The knowledge distillation based semantic image segmentation method according to claim 1, wherein the generating of a second channel and space association matrix includes:

calculating a second channel associated vector with respect to the C labels, based on the normalized second feature vector and a circularly shifted vector of the normalized second feature vector;

calculating a second channel association matrix by concatenating and realigning the second channel associated vector for the C labels; and determining a second channel association matrix as a second channel and space association matrix.

6. The knowledge distillation based semantic image segmentation method according to claim 1, wherein the first channel association vector is determined by performing element-wise multiplication on the normalized first feature vector and a circularly shifted vector of the normalized first feature vector with respect to C labels.

7. The knowledge distillation based semantic image segmentation method according to claim 1, wherein a width of the first channel association matrix and the second channel association matrix is a value obtained by multiplying a width and a height of a feature map of a last layer of the teacher network and a height of the first channel association matrix and the second channel association matrix is a square of C.

8. The knowledge distillation based semantic image segmentation method according to claim 1, wherein the widths and the heights of the first channel and space association matrix and the second channel and space association matrix are values obtained by multiplying the width and the height of the feature map of the last layer of the teacher network.

* * * * *